Patented Feb. 20, 1951

2,542,489

UNITED STATES PATENT OFFICE 2,542,489

TARNISH RESISTANT OPHTHALMIC GLASS

James Earle Duncan, Brackenridge, Pa., assignor to Pittsburgh Plate Glass Co., county of Allegheny, Pa., a corporation of Pennsylvania No Drawing. Application March 26, 1947, Serial No. 737,419

4 Claims. (Cl. 106—53)

The present invention relates to ophthalmic glasses and more particularly to novel compositions of barium crown glasses possessing special properties.

In the manufacture of lenses for bifocal glasses, there are utilized two types of glass, one providing the major portion of the lense while the other constitutes merely the inset or minor portion thereof. Obviously, many different combinations of glass may be selected in the preparation of composite lenses. For optimum results, however, the field is much more limited inasmuch as the compositions must be correlated to obtain the proper optical result and to permit a welding or fusing together of the segments.

The so-called "crown" glasses are usually employed for ophthalmic purposes because of their brilliance and the relationships of index of refraction to dispersion factor. The ordinary or light "crown" glass, having an index of refraction above 1.50 and a reciprocal of dispersion (nu value) above 45, provides the major portion of a bifocal lense. The inset or minor portion of the lense is ordinarily formed of a dense "crown" glass wherein the index of refraction is above 1.60 and the nu value is greater than 50.

Dense crown glasses, to meet the specified indices and dispersion factors, may vary widely in composition, although it is customary to include a large amount of barium oxide therein and to identify them as barium crown glasses. While these barium crown glasses have the desired optical properties they are accompanied by certain physical properties which create difficulties. For example, the glasses have relatively high softening points so that fabrication thereof is not easy. The glasses are also marked by relatively low coefficients of thermal expansion and their fusion to light crown glasses having higher coefficients of expansion is troublesome. Furthermore, dense barium crown glass is highly susceptible to surface deterioration, identified as tarnish or stain, which seriously impairs its value.

Numerous attempts have been made to formulate barium crown melts which will be free from these recognized defects and in particular more resistant to tarnishing. These endeavors have not been completely successful, however, for additives designed to improve the melt with respect to tarnish affect the optical properties of the glass so that they no longer meet the specifications peculiar to the crown type. Similarly, when it is sought to lower the softening point of the glass, there is experienced an increase in the ease with which the glass tarnishes.

A principal object of this invention is the provision of a barium crown glass which will possess the desired optical and physical characteristics together with an increased resistance to surface tarnish.

Other objects and advantages of the invention will become apparent from consideration of the following detailed description of certain preferred embodiments thereof.

I have found, and the present application is based upon the discovery, that it is possible to impart the desired properties to a barium crown glass by incorporation therein of from 0.5 to 6 percent by weight of lithium oxide.

The inclusion of lithium oxide into various glass compositions is not new although its application in this particular field has not been particularly wide spread. For example, lithium oxide has been substituted for a part of the alkali metal oxides in certain melts where it has been desired to increase the coefficient of thermal expansion thereof. Again lithium oxide has been employed to the exclusion of all other alkalies in the preparation of an electrically fusible glass.

The knowledge of the effects of lithium oxide on the properties of prior glass melts would seem to indicate that its presence in a barium crown glass is to be avoided. Not only would the coefficient of thermal expansion of the glass be increased but also since the alkali metal oxides are responsible for the surface tarnish of barium crown glass, its susceptibility thereto would be enhanced. Despite the fact that the softening point of a barium crown glass would be lowered by the addition of lithia to the melt, this advantage could be gained only at the expense of other, more important characteristics.

It is possible to incorporate successfully lithium oxide in a barium crown glass by a careful selection and apportionment of the remaining ingredients of the composition. The lithium oxide is not employed in addition to the normal complement of alkali metal oxides, nor is it employed in lieu of other alkali metal oxides. Together with potassium oxide and possibly other components, it provides the necessary flux for the entire composition.

The following table illustrates several examples of compositions of barium crown glass embodying my inventive concept. The ingredients of the composition are given as percentages by weight:

|  | 1 | 2 | 3 | 4 | 5 |
|---|---|---|---|---|---|
| $SiO_2$ | 42.00 | 43.09 | 43.09 | 43.04 | 43.42 |
| $BaO$ | 36.07 | 35.35 | 31.43 | 36.52 | 36.82 |
| $K_2O$ | 4.09 | 2.22 | 2.22 | 2.25 | |
| $Li_2O$ | 1.95 | 3.76 | 3.76 | 3.76 | 5.68 |
| $B_2O_3$ | 6.94 | 6.50 | 6.50 | 6.52 | 10.52 |
| $ZnO$ | | 4.39 | 4.39 | 4.38 | |
| $PbO$ | 5.92 | | 6.07 | | |
| $TiO_2$ | 2.48 | 2.54 | 1.98 | 2.98 | 3.00 |
| $Sb_2O_5$ | .42 | 2.02 | .43 | | .43 |
| $As_2O_5$ | .13 | .13 | .13 | .55 | .13 |

Each of the glasses set forth in the table possesses an index of refraction greater than 1.60 and a reciprocal of dispersion (nu value) higher than 50. The glasses have softening points below 690° C. affording excellent workability. The mean linear coefficients of thermal expansion per degree C. between 26° C. and 300° C. are approximately $9 \times 10^{-6}$, while between 26° C. and 500° C., they will be increased to $10.2 \times 10^{-6}$. In these respects, therefore, the new glasses exhibit the properties known to be desirable for their successful adaption in the manufacture of ophthalmic devices.

Despite the presence of lithium oxide in the glass melts, they exhibit a remarkable resistance to tarnishing or staining. The conventional barium crown glass will develop an iridescence when merely exposed to a humid atmosphere. Contact with a slightly acidic solution creates the objectionable iridescence almost immediately. Samples of my improved barium crown glass, however, have been immersed in 3 N hydrochloric acid at 25° C. for over 180 seconds without formation of stain upon the polished surfaces thereof. This accelerated test, far more severe than any condition which will normally be experienced, demonstrates clearly the superior resistance to stain possessed by the designated glass compositions.

The lithium content of my barium crown glasses is generally obtained by its incorporation in the glass melt in the form of lithium carbonate. It will be understood that other compounds of lithium may be employed if desired, it being necessary only to insure the presence of from 0.5 to 6 per cent by weight of lithium oxide in the ultimate glass.

What I claim is:

1. A tarnish resistant barium crown optical glass having the composition percentage by weight:

| | |
|---|---|
| $SiO_2$ | 43.09 |
| BaO | 35.35 |
| $K_2O$ | 2.22 |
| $Li_2O$ | 3.76 |
| $B_2O_3$ | 6.50 |
| ZnO | 4.39 |
| $TiO_2$ | 2.54 |
| $Sb_2O_5$ | 2.02 |
| $As_2O_5$ | .13 |

2. A tarnish resistant barium crown optical glass consisting of from 42 to 43.42 percent by weight of $SiO_2$, from 31.43 to 36.82 percent by weight of BaO, from 0 to 4.09 percent by weight of $K_2O$, from 1.95 to 5.68 percent by weight of $Li_2O$, from 6.50 to 10.52 percent by weight of $B_2O_3$, from 0 to 4.39 percent by weight of ZnO, from 0 to 6.07 percent by weight of PbO, from 1.98 to 3.00 percent by weight of $TiO_2$, from 0 to 2.02 percent by weight of $Sb_2O_5$, and from 0.13 to 0.55 percent by weight of $As_2O_5$.

3. A tarnish resistant barium crown optical glass consisting of from 43.04 to 43.42 percent by weight of $SiO_2$, 35.35 to 36.82 percent by weight of BaO, from 0 to 2.25 percent by weight of $K_2O$, from 3.76 to 5.68 percent by weight of $Li_2O$, the total amount of $K_2O$ and $Li_2O$ varying between 5.68 and 6.01 percent by weight, from 6.50 to 10.52 percent by weight of $B_2O_3$, from 0 to 4.39 percent by weight of ZnO, from 2.54 to 3.00 percent by weight of $TiO_2$, from 0 to 2.02 percent by weight of $Sb_2O_5$, and from 0.13 to 0.55 percent by weight of $As_2O_5$.

4. A tarnish resistant barium crown optical glass having the composition:

| | Percent by weight |
|---|---|
| $SiO_2$ | 43.42 |
| BaO | 36.82 |
| $Li_2O$ | 5.68 |
| $B_2O_3$ | 10.52 |
| $TiO_2$ | 3.00 |
| $Sb_2O_5$ | 0.43 |
| $As_2O_5$ | 0.13 |

JAMES EARLE DUNCAN.

REFERENCES CITED

The following references are of record in the file of this patent:

UNITED STATES PATENTS

| Number | Name | Date |
|---|---|---|
| 1,765,287 | Scott | June 17, 1930 |
| 2,018,817 | Taylor | Oct. 29, 1935 |
| 2,413,549 | Deyrup | Dec. 31, 1946 |
| 2,414,504 | Armistead | Jan. 21, 1947 |
| 2,433,883 | Armistead | Jan. 6, 1948 |

OTHER REFERENCES

Morey: Properties of Glass (1938), pages 85, 101, 406, 408, 409, 410, 411.